United States Patent Office 3,377,364
Patented Apr. 9, 1968

3,377,364
6 - METHYL - 17α - HYDROXYPROGESTERONE, THE LOWER FATTY ACID 17-ACYLATES AND METHODS FOR PRODUCING THE SAME
George B. Spero, Kalamazoo, Mich., assignor to The Upjohn Company, Kalamazoo, Mich., a corporation of Michigan
No Drawing. Continuation-in-part of application Ser. No. 623,774, Nov. 23, 1956. This application Sept. 23, 1957, Ser. No. 685,391
13 Claims. (Cl. 260—397.4)

The present invention relates to steroid compounds and is more particularly concerned with 6-lower-alkyl substituted 17α-hydroxyprogesterone esters and particularly with 6-methyl-17α-hydroxyprogesterone esters and intermediates therefor; especially unesterified 6-lower-alkyl-17α-hydroxyprogesterone, and a process of production thereof.

This application is a continuation-in-part of application Ser. No. 623,774, filed Nov. 23, 1956 now abandoned.

The new compounds and the process of the present invention are illustratively represented by the following formulae:

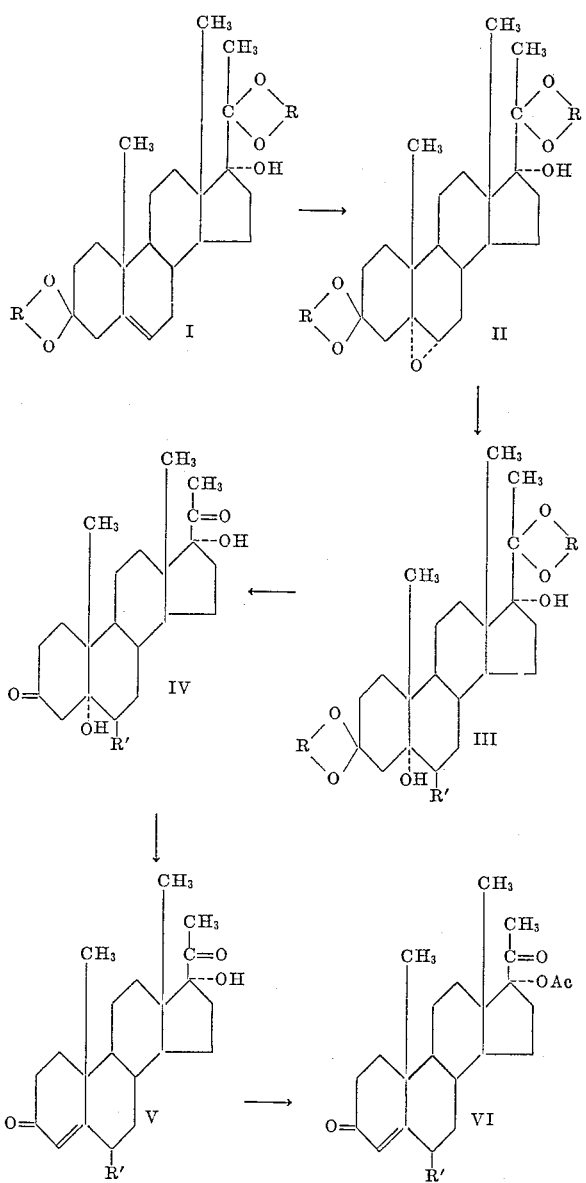

wherein R is an alkylene radical containing not more than eight carbon atoms, inclusive, and the attaching oxygen to carbon bonds are separated by a chain of at least two and not more than three carbon atoms; wherein R' is a lower alkyl radical containing from one to four carbon atoms, and Ac is the acyl radical of an organic carboxylic acid and preferably a hydrocarbon carboxylic acid containing from one to twelve carbon atoms, inclusive.

The process of the present invention comprises: treating a 17α-hydroxyprogesterone 3,20-bis-(alkylene ketal) (I), with a peracid, such as performic, peracetic, and perbenzoic, to obtain 5α,6α-oxido-17α-hydroxypregnane-3,20-dione 3,20-bis-(alkylene ketal) (II); treating the thus obtained 5α,6α - oxido - 17α-hydroxypregnane-3,20-dione 3,20-bis-(alkylene ketal) (II) with a lower alkyl metal compound, preferably an alkyl metal halide such as a methyl Grignard reagent to give the corresponding 5α,17α-dihydroxy-6β-alkylpregnane-3,20-dione 3,20-bis-(alkylene ketal) (III); hydrolyzing with aqueous acid in a suitable solvent the thus obtained diketal (III) to yield 5α,17α-dihydroxy-6β-alkylpregnane-3,20-dione (IV), and dehydrating the thus obtained 5α,17α-dihydroxy-6-alkylpregnane-3,20-dione (IV) with a base or an acid to obtain 6-alkyl-17α-hydroxy-4-pregnene-3,20-dione (6 - alkyl - 17α-hydroxyprogesterone) (V).

Higher concentrations of base or acid produce the 6α-epimer of V, while milder conditions produce the 6β-isomer. The 6β-alkyl-17α-hydroxyprogesterone can also be converted to 6α-alkyl-17α-hydroxyprogesterone by enolyzing agents selected from mineral acids or bases, e.g., sulfuric, perchloric, hydrochloric, nitric (dilute), or alkali bases such as sodium or potassium hydroxide or carbonate.

Esterification of the 17α-tertiary alcohol group of 6-alkyl-17α-hydroxyprogesterone (V) to obtain the 6-alkyl-17α-hydroxyprogesterone acylate (VI) is carried out either by heating the starting material (V) with an anhydride of a selected acid or allowing V to react at temperatures between zero and 35 degrees centigrade with the acid anhydride in the presence of an acid catalyst, e.g. toluene-sulfonic acid, sulfuric acid and the like.

It is an object of the instant invention to provide 6-alkyl-17α-hydroxyprogesterone esters and intermediates for the production thereof, such as 6-alkyl-17α-hydroxyprogesterone, 5α,17α - dihydroxy - 6β-alkylpregnane-3,20-dione and the alkylene ketals thereof, having from one to eight carbon atoms in the alkylene chain. It is another object of the instant invention to provide a process for the production of 6-alkyl-17α-hydroxyprogesterone esters (both the 6α and 6β-epimers) and the intermediates 6-alkyl - 17α - hydroxyprogesterone, 5α,17α - dihydroxy-6β-methylpregnane-3,20-dione and 3,20-bis-(alkylene ketals) thereof. It is a particular object of the instant invention to provide the 17-esters of 6α-methyl-17α-hydroxyprogesterone, specially the acetate thereof and a method for the production thereof. Other objects of this invention will be apparent to those skilled in the art to which this invention pertains.

The new products 6-alkyl-17α-hydroxyprogesterone esters have utility as oral and parenteral progestational agents. Owing to their progesterone like effects, the esters of this invention find application in "cyclic" therapy, where estrogenic and progestational hormones are supplied together or in succession so as to favor re-establishment of normal endometrium-ovary-anterior pituitary relationships in cases of menstrual disturbances.

Tablets for oral use (50,000) are prepared from the following types and amounts of material:

6α-methyl-17α-hydroxyprogesterone 17α-acetate _oz__ 5
Lactose USP _____lbs__ 3

An aqueous suspension for oral use, containing in each five cc. dose 5 milligrams of 6α-methyl-17α-hydroxyprogesterone β-cyclopentylpropionate, is prepared from the following types and amounts of materials:

| | | |
|---|---|---|
| 6α - methyl-17α-hydroxyprogesterone β-cyclopentylpropionate, micronized | grams | 1 |
| Citric acid USP | do | 2 |
| Benzoic acid USP | do | 1 |
| Methylparaben USP | do | 2 |
| Propylparaben USP | do | 0.5 |
| Glycerine USP | cc | 150 |
| Tragacanth powder USP | grams | 7.5 |
| Essential oil flavor concentrate | cc | 0.2 |
| Sucrose USP | grams | 400 |
| Deionized water to make | cc | 1000 |

The citric acid is dissolved in 500 cc. of water. The benzoic acid and parabens are added to the glycerine in a separate container, followed by the finely powdered 6α-methyl - 17α - hydroxyprogesterone β-cyclopentylpropionate, tragacanth and flavors in the order named. This is mixed until a uniform suspension is achieved and then added to the aqueous solution with rapid stirring. Finally, the sugar is added and the whole mixed thoroughly followed by processing through a colloid mill. Sufficient water is employed to rinse the colloid mill and the rinsings used to bring the final volume to 1000 cc. The suspension is assayed for potency and used clinically.

For parenteral use microcrystalline aqueous suspension of 17α-hydroxy-6-methylprogesterone esters can be used.

Instead of the 6α-methyl-17α-hydroxyprogesterone 17-ester, the β-isomers or other 6α or 6β-lower-alkyl-17α-hydroxyprogesterone esters wherein the alkyl group is methyl, ethyl, propyl, isopropyl, butyl, isobutyl and the like can be substituted in the above-preparations in pharmaceutically equivalent amounts. Other esters of 6-alkyl-17α-hydroxyprogesterone used, include the propionate, butyrate, isobutyrate, valerate, isovalerate, hexanoate, heptanoate, octanoate, β-cyclopentylpropionate, benzoate, toluate, phenylacetate, phenylpropionate, hemisuccinate, β-dimethylglutarate, cyclohexylformate, decanoate, undecanoate, laurate, undecylenate, acetate, acrylate, crotonate, formate, phenoxyacetate and the like. The unesterified compound, 6α-methyl-17α-hydroxyprogesterone is not only an important intermediate for the production of the above mentioned progestationally active esters, but also serves as an intermediate for the production of adrenocortically active steroids. For example fermentation of 6α-methyl - 17α - hydroxyprogesterone with Cunninghamella blakesleeana gives the highly adrenocortically active, anti-inflammatory 6α - methyl-11β,17α-dihydroxy-4-pregnene-3,20-dione. Additional step-wise fermentation of 6α-methyl - 11β,17α - dihydroxy-4-pregnene-3,20-dione with Ophiobolus herpotrichus, Centraalbureau voor Schimmelcultur, Baarn, Holland, and then with Septomyxa affinis, ATCC 6737, produces the highly-active anti-inflammatory and anti-arthritic compound, 1-dehydro-6α-methylhydrocortisone.

The starting compounds of the instant invention are 17α - hydroxyprogesterone 3,20 - diketals, produced as shown in Preparations 1 and 2.

In carrying out the process of the present invention 17α-hydroxyprogesterone 3,20-bis-(alkylene ketal) is dissolved in an inert organic solvent such as chloroform, methylene chloride, ethylene dichloride, carbon tetrachloride, benzene, toluene, or the like, and treated with a peracid, e.g., an organic peracid such as performic, peracetic, perpropionic, perbenzoic, monoperphthalic acid or other organic peracids. The reaction is generally carried out at low temperatures such as between minus ten and plus ten degrees centigrade. However, higher or lower temperatures such as minus thirty to up to plus forty degrees centigrade are operable.

In the preferred embodiment of the invention temperatures between zero and five degrees, a chlorinated hydrocarbon such as chloroform or methylene dichloride and peracetic or perbenzoic acid are used. The peracid is used in a quantity usually from ten to twenty percent above the one theoretically required up to five times the one required by theory.

At the end of the reaction, the mixture is neutralized, preferably with sodium or potassium carbonate or bicarbonate, washed with water and the thus produced 5α,6α-oxido - 17α - hydroxypregnane-3,20-dione 3,20-bis-(alkylene ketal) recovered by evaporation of the solvents. Recrystalization from organic solvents such as methanol, ethanol, Skellysolve B hexanes, heptanes, benzene, toluene, or the like, provides pure 5α,6α-oxido-17α-hydroxypregnane 3,20-dione 3,20-bis-(alkylene ketal).

The thus obtained 5α,6α-oxido-17α-hydroxyallopregnane-3,20-dione 3,20-bis-(alkylene ketal), dissolved in a suitable inert organic solvent, such as tetrahydrofuran, benzene, toluene, ethyl ether, propyl ether, or the like, with the higher boiling solvents such as tetrahydrofuran and benzene preferred, is allowed to react with an alkyl metal compound, especially a methyl metal halide compound such as methyl magnesium chloride, bromide, or iodide, methyl lithium, dimethyl cadmium, or the like. Other organometallic agents which can be used include the ethyl, propyl and butyl magnesium bromide, or the corresponding alkyl sodium or potassium compound, the alkyl cadmium halides and dialkyl cadmium compound, wherein the alkyl group has from one to four carbon atoms, and the like, with methyl magnesium bromide and methyl magnesium iodide preferred. In the preferred embodiment of the invention this reaction is started at room temperature or below, temperatures between zero and thirty degrees centigrade being preferred. After the addition of the methyl magnesium halide or other methyl metal halides, the temperature is raised and the reaction mixture is heated to about reflux temperature for a period of from one to 48 hours. In general, a large excess of the Grignard reagent (ten to 500 mole equivalents) is used. The temperature for the Grignard addition reaction is generally between 25 to 100 degrees centigrade, with the preferred range of from sixty degrees centigrade to the reflux temperature of the mixture.

After the reaction is terminated, the reaction product is decomposed using neutral conditions. In the preferred embodiment of the invention, the reaction product is decomposed by mixing the reaction mixture with an aqueous saturated ammonium chloride solution, cooled, and the resulting mixture is stirred for a period of several minutes to one hour. The aqueous and organic layers are then separated from each other. The organic phase is washed, dried and evaporated to give as a residue the crude 5α,17α - dihydroxy-6β-methylpregnane-3,20-dione 3,20-bis-(alkylene ketal). This latter compound can be purified by conventional procedures, such as recrystallization and/or chromatography with organic solvents, as deemed necessary.

The thus obtained 5α,17α-dihydroxy-6β-methylpregnane-3,20-dione 3,20-bis-(alkylene ketal) is thereupon hydrolyzed in a water-miscible solvent, preferably in an aqueous alkanol or acetone acidic medium. As solvent alkanols, methanol and ethanol are the preferred alkanols, however, other suitable water-miscible solvents such as tertiary butyl alcohol, propyl alcohol, isopropyl alcohol dioxane, acetone, or the like can be used. To the solution of the steroid is then added an organic or inorganic acid, preferably a mineral acid such as sulfuric acid or hydrochloric acid; but organic acids such as formic, acetic, propionic, and toluenesulfonic, can also be used. The thus obtained mixture is preferably refluxed to accelerate the hydrolysis, then neutralized with sodium bicarbonate, sodium carbonate, potassium carbonate, sodium hydroxide, or other alkali solutions, and concentrated to give a crude product consisting of 5α,17α-dihydroxy-6β-methylpregnane-3,20-dione. The crude product can be purified using known techniques for example by recrystallization from organic solvents such as acetone, ethyl acetate, Skellysolve B hexanes, methanol, tertiary butyl alcohol, ether, or the like, or mixtures thereof to give pure 5α,17α-dihydroxy-6β-methylpregnane-3,20-dione.

The thus obtained 5α,17α-dihydroxy-6β-methylpregnane-3,20-dione is thereupon dehydrated. Dehydration can be effected in alkali solution or in acidic solution. In the preferred embodiment of the present invention acid dehydration is used. The steroid is dissolved or suspended in solvents unreactive to the acid employed, e.g. methylene chloride, chloroform, dioxane, and carbon tetrachloride; and to the solution or suspension is added the selected acid. Acids particularly useful for this reaction are strong acids, e.g. gaseous hydrogen chloride or hydrogen bromide, sulfuric acid and the like, with gaseous hydrogen chloride preferred. For dehydration with alkali the steroid is dissolved in methanol, ethanol, dioxane, or other convenient solvents, unreactive to the base employed, the solution purged of oxygen by bubbling nitrogen through the solution, and allowed to react with an oxygen-free alkali metal base solution. Sodium or potassium hydroxide are the preferred bases; however, alkali metal alkoxides, barium hydroxide, calcium hydroxide, or the like, can be used.

Depending on the amount of acid or base used, the 6α or 6β-isomers are obtained. The dehydration produces at first the 6β-isomer which, being less stable in strong acid or bases, rearranges to the 6α-isomer. If, at the start of the dehydration reaction, the medium was strongly acidic or basic only 6α-alkyl-17α-hydroxyprogesterone is obtained, while a weakly acidic or basic medium furnishes the 6β-alkyl-17α-hydroxyprogesterone. The 6β-isomer can subsequently be converted to the 6α-isomer by treatment with strong acid or base.

The thus obtained 6-alkyl-17α-hydroxyprogesterones are isolated from the reaction mixture and purified by conventional procedures, such as by diluting with water and extracting the mixture with a water-immiscible solvent, methylene chloride, chloroform, hexanes, benzene, ether and the like, evaporating the solvent and recrystallizing the thus obtained solids from organic solvent, such as methanol, ethanol, Skellysolve B hexanes, ethyl acetate, benzene or the like to obtain the pure 6-alkyl-17α-hydroxyprogesterone.

The esterification of the thus obtained 6-alkyl-17α-hydroxyprogesterone is carried out by methods well established in the art of esterifying tertiary hydroxyl groups, e.g., Huang-Minlon et al., J. Am. Chem. Soc., 74, 5394 (1952). Huang-Minlon et al. describe both a "cold method" and a "hot method," both of which are equally useful in the esterification of 6α-alkyl-17α-hydroxyprogesterones. If the esterification of the 6β-isomer, the β-isomers are to be obtained, mild conditions are necessary (cold method, low amount of acid catalyst) since otherwise a conversion of the 6β-isomer to the 6α-isomer takes place. Details of the various methods are shown in the subsequent examples.

The following preparations and examples are illustrative of the products and the process of the present invention and are not to be construed as limiting.

Preparation 1.—17α-hydroxyprogesterone 3,20-bis-(ethylene ketal)

A solution was prepared containing 50.0 grams of 17α-hydroxyprogesterone in 1000 milliliters of benzene, 100 milliliters of ethylene glycol and 2.5 grams of paratoluenesulfonic acid monohydrate. This mixture was refluxed for a period of seventeen hours using a calcium carbide water trap to remove the water formed in the reaction. After this period of reflux 6.5 milliliters of pyridine was added to the solution, and the mixture cooled to room temperature. The lower glycol layer was separated and washed with benzene. The benzene layer and the washings with benzene were combined and the combined solution was divided into two equal portions, one of which was used for the isolation of 17α-hydroxyprogesterone 3,20-bis-(ethylene ketal) as follows: The benzene solution was washed with five percent sodium carbonate solution, water and saturated sodium chloride solution. After being dried over anhydrous magnesium sulfate the solution was concentrated to dryness at reduced pressure. The residue was recrystallized by taking up in hot methylene chloride, adding acetone and boiling to remove the methylene chloride until a final volume of about 200 milliliters was reached. The solution was then refrigerated overnight and 17.8 grams of crystals were removed by filtration. A second crop was obtained yielding 3.7 grams of compound. The total yield of 17α-hydroxyprogesterone 3,20-bis-(ethylene ketal) was 20.3 grams (64.3 percent of theory). Recrystallization of the crude 17α-hydroxyprogesterone 3,20-bis-(ethylene ketal) from methanol gave the pure diketal of melting point 209 to 211 degrees centigrade and rotation [α]$_D$ minus 49 degrees (in chloroform).

Analysis.—Calcd. for $C_{25}H_{38}O_5$: C, 71.74; H, 9.15. Found: C, 71.65; H, 9.38.

Preparation 2.—17α-hydroxyprogesterone 3,20-bis-propylene ketal)

In the same manner given in Preparation 1, 17α-hydroxyprogesterone, dissolved in benzene and propylene glycol, was heated to reflux in the presence of paratoluenesulfonic acid for a period of eighteen hours to give 17α - hydroxyprogesterone 3,20 - bis - (propylene ketal).

In the same manner as shown in Preparations 1 and 2, other 17α - hydroxyprogesterone 3,20-bis - (alkylene ketals) are prepared by reacting at reflux temperature solutions of 17α-hydroxyprogesterone in benzene, toluene, hexane, heptane, or other inert organic solvents with 1,2-alkane diols or 1,3-alkane diols such as butane-1,2-diol, butane-1,3-diol, pentane-1,2- and 1,3-diol, hexane-1,2- and 1,3-diol, heptane-1,2- and 1,3-diol, octane-1,2- and 1,3-diol, or other alkane diols of the formula:

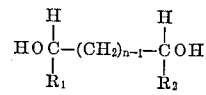

wherein $n$ is an integer having a value from one to two, inclusive, and $R_1$ and $R_2$ are selected from the group consisting of hydrogen and lower alkyl radicals containing up to six carbon atoms and wherein the total number of carbon atoms in the alkane diol is up to and including eight carbon atoms, in the presence of a strong acid such as toluenesulfonic acid, ortho-chlorobenzenesulfonic acid, sulfuric acid, and the like, to obtain the corresponding 17α-hydroxyprogesterone 3,20-bis-(alkylene ketal). Representative 17α-hydroxyprogesterone bis - (alkylene ketals) include the 17α-hydroxyprogesterone 3,20-bis-(1,3-propylene ketal), 1,2 and 1,3-butylene diketal, 1,2- 1,3- and 3,4-pentylene diketal, and the like.

Example 1.—5,6-oxido-17α-hydroxypregnane-3,20-dione 3,20-bis-(ethylene ketal)

A solution was prepared by heating 19.96 grams (0.0477 mole) of 17α-hydroxyprogesterone 3,20-bis-(ethylene ketal) and 500 milliliters of benzene. After the solution was effected the flask was cooled to five degrees centigrade and a mixture of 3.68 grams (0.0449 mole) of sodium acetate and 174 milliliters of forty percent peracetic acid was added with stirring. The reaction mixture was stirred in the ice bath for three hours. The lower peracid layer was separated, diluated with water and extracted twice with benzene. The upper layer was neutralized by the addition of cold ten percent sodium hydroxide solution while stirring in an ice bath. The rate of addition of the sodium hydroxide was regulated to keep the temperature below ten degrees centigrade. The benzene extracts from the peracid layer were added, the layer separated and the benzene layer was washed with cold ten percent sodium hypdroxide solution and saturated sodium chloride solution. All the aqueous layers were washed again with the same portion of benzene. The combined benzene layers were dried over anhydrous magnesium sulfate and concentrated to dryness at reduced pressure. The residue was recrystallized from acetone using methylene chloride to aid in solution. The crystalline material was removed by filtration and was recrystallized from methylene chloride-acetone to yield a total of eight grams of 5,6-oxido-17α-hydroxypregnane - 3,20-dione 3,20-bis-(ethylene ketal) of melting point 211 to 215. For analytical proposes, another recrystallization from methylene chloride-acetone gave pure 5α,6α-oxido-17α-hydroxypregnane-3,20-dione 3,20-bis-(ethylene ketal) of melting point 216 to 218.5 degrees centigrade and rotation $[\alpha]_D$ of minus seventy degrees in chloroform.

*Analysis.*—Calcd. for $C_{25}H_{38}O_6$: C, 69.09; H, 8.81. Found: C, 69.05; H, 9.04.

In the same manner, 5α,6α-oxido-17α-pregnane-3,20-dione 3,20-bis-(ethylene ketal) is obtained by substituting performic acid, perbenzoic acid or monoperphthalic acid for the peracetic acid in the foregoing example.

Example 2.—5α,6α-oxido-17α-hydroxypregnane-3,20-dione 3,20-bis-(propylene ketal)

In the same manner as shown in Example 1, reacting 17α-hydroxyprogesterone 3,20-bis-(propylene ketal) with peracetic acid and anhydrous sodium acetate in chloroform solution produced 5α,6α-oxido-17α-hydroxypregnane-3,20-dione 3,20-bis-(propylene ketal).

In the same manner as shown in Examples 1 and 2, other 5α,6α-oxido-17α-hydroxypregnane-3,20-dione 3,20-bis-(ketals) are prepared by reacting the corresponding 17α-hydroxyprogesterone bisketal with a peracid, such as performic, per acetic, perpropionic, perbenzoic, monoperphthalic acid, at low temperatures usually between minus ten and plus ten degrees centigrade. Representative compounds thus prepared comprise 5α,6α-oxido-17α-hydroxypregnane-3,20-dione 3,20-bis-(1,3-propylene ketal), 5α,6α-oxido-17α-hydroxypregnane - 3,20-dione 3,20-bis-(1,2-butylene ketal) the 2,3- and the 1,3-butylene ketals of 5α,6α-oxido-17α-hydroxypregnane 3,20-dione, the 1,2-, 2,3-, 2,4- and 1,3-pentylene ketals and the 1,2-, 1,3-hexylene, 1,2- 1,3-heptylene, 1,2-, 1,3-octylene ketals of 5α,6α-oxido-17α-hydroxypregnane-3,20 - dione, and the like.

Example 3.—5α,17α-dihydroxy-6β-methylpregnane-3,20-dione 3,20-bis-(ethylene ketal)

To a solution of 91.6 grams of 5α,6α-oxido-17α-hydroxy - pregnane - 3,20-dione 3,20-bis-(ethylene ketal) in 3,500 milliliters of freshly distilled tetrahydrofuran was added 1170 milliliters of commercial three molar methyl magnesium bromide solution. The reaction mixture was boiled to remove 1800 milliliters of solvent by distillation and thereafter 1000 milliliters of freshly distilled tetrahydrofuran was added. Boiling was continued under reflux for a period of sixteen hours. The solution was then concentrated to about one half its original volume by distillation and was poured slowly with vigirous stirring into a large volume of ice water containing 340 grams of ammonium chloride. The aqueous solution was saturated with sodium chloride and extracted with benzene. The benzene extract was washed with saturated brine, and both aqueous layers were washed again with the same portions of benzene. The combined benzene layers were dried over anhydrous sodium carbonate and the solvent was removed at reduced pressure to give 90.5 grams of crude crystalline 5α,17α-dihydroxy-6β-methyl pregnane-3,20-dione 3,20-bis-(ethylene ketal). Half of the residue, 45.2 grams, was recrystallized from acetone and some methylene chloride to give 34.4 grams of 5α,17α-dihydroxy-6β-methylpregnane - 3,20-dione 3,20-bis-(ethyleneketal). A sample recrystallized from acetone and methylene chloride for analysis melted at 160 to 163 degrees centigrade and had rotation $[\alpha]_D$ of minus 38 degrees in chloroform.

*Analysis.*—Calcd. for $C_{26}H_{42}O_6$: C, 69.30; H, 9.40. Found: C, 68.90; H, 9.78.

Example 4.—5α,17α-dihydroxy-6β-methylpregnane-3,20-dione 3,20-bis-(propylene ketal) from 5α,6α-oxido-17α-hydroxypregnane-3,20-dione 3,20-bis-(propylene ketal)

In the same manner as shown in Example 3, treating a solution of 5α,6α-oxido-17α-hydroxypregnane - 3,20-dione 3,20-bis-(propylene ketal) in benzene with methyl magnesium iodide in ether resulted in 5α,17α-dihydroxy-6β-methylpregnane-3,20-dione 3,20-bis-(propylene ketal).

In the same manner as shown in Examples 3 and 4, other bis-ketals when reacted with methyl magnesium bromide or iodide in solution such as tetrahydrofuran, benzene, ether, or mixtures thereof, or the like, give the corresponding 5α,17α-dihydroxy-6β-methylpregnane-3,20-dione 3,20-bis-ketals.

In the same manner as shown in Examples 3 and 4, reacting 5α,6α-oxido-17α-hydroxypregnane - 3,20 - dione 3,20-bis-(alkylene ketals) with alkyl magnesium halides, such as ethyl, propyl, isopropyl, butyl and isobutyl magnesium iodide or magnesium bromide or the like, yields the corresponding 5α-hydroxy-6β-alkyl-17α-hydroxypregnane-3,20-dione 3,20-bis-(alkylene ketal) wherein the alkyl group can be methyl, ethyl, propyl, isopropyl, butyl, isobutyl, or the like.

Example 5.—5α,17α-dihydroxy-6β-methylpregnane-3,20-dione

A solution was prepared containing 38.9 grams of 5α,17α-dihydroxy-6β-methylpregnane-3,20-dione 3,20-bis-(ethylene ketal) in 389 milliliters of boiling acetone. Thereto was added 39 milliliters of one normal sulfuric acid in portions under swirling and seeding with product. Boiling was continued for a period of two minutes and the mixture was allowed to stand at room temperature. Thereafter the mixture was diluted with 1500 milliliters of water, chilled and filtered. The precipitate was washed with water, dilute ammonium hydroxide and water, and dried in a vacuum oven overnight. The yield was 31.2 grams which was recrystallized by dissolving in 1200 milliliters of dimethylformamide, heating to 150 degrees centigrade, cooling slightly, and adding twelve milliliters of hot water. The recrystallized 5α,17α-dihydroxy-6β-methylpregnane-3,20-dione thus obtained was 28.75 grams of melting point 270 to 275.5 degrees centigrade. After an additional recrystallization from aqueous dimethylformamide, the melting point was 274 to 279 degrees centigrade.

Example 6.—6α-methyl-17α-hydroxyprogesterone

A suspension was made by introducing two grams of 5α,17α-dihydroxy-6β-methylpregnane-3,20-dione into 200 milliliters of chloroform. The suspension was chilled in an ice bath with stirring, and thereupon hydrogen chloride was bubbled through the reaction mixture for eighty minutes with continuous cooling and stirring. After bubbling in nitrogen for a period of fifteen minutes the solution was washed with water, 1 N sodium bicarbonate solution and again with water. The aqueous layers were rewashed with one portion of chloroform, and the washings combined with the remainder of the chloroform solution.

After drying over anhydrous magnesium sulfate, the chloroform solution was concentrated to dryness, then taken up in a small volume of methylene chloride, treated with Magnesol anhydrous magnesium silicate and filtered. Acetone was added to the solution and the solution was boiled to remove the methylene chloride. After the solution was concentrated to a volume of about fifteen milliliters it was chilled and the crystals were collected through filtration. The 1.37 grams of crystals so obtained were recrystallized from acetone to give pure 6α-methyl-17α-hydroxyprogesterone of melting point 220 to 223.5 degrees centigrade and rotation $[\alpha]_D$ of plus 75 degrees centigrade in chloroform.

*Analysis.*—Calcd. for $C_{22}H_{33}O_3$: C, 76.70; H, 9.36. Found: C, 76.24; H, 9.30.

Example 7.—6β-methyl-17α-hydroxyprogesterone

A solution of 400 milliliters of pyridine, 100 milliliters of ethyl alcohol, 25 milliliters of water and containing three milliliters of one normal sodium hydroxide solution was purged of oxygen by bubbling nitrogen through the solution for a period of several minutes. Thereto was added five grams of 5α,17α-dihydroxy-6β-methylpregnane-3,20-dione. The mixture was stirred vigorously and the steroid was completely dissolved after 25 minutes. After a total reaction time of three and one quarter hours, the reaction was stopped by the addition of one milliliter of acetic acid and the mixture concentrated to dryness at reduced pressure.

The dry residue was taken up in about 500 milliliters of a warm mixture of acetone and methylene chloride. The solution was filtered to remove the organic-insoluble material and the filtrate was concentrated to about 110 milliliters, chilled and the crystals thus obtained collected by filtration. A yield of 3.70 grams of crude 6β-methyl-17α-hydroxyprogesterone was obtained, which after recrystallization from acetone melted at 232 to 240 degrees centigrade and had rotation $[\alpha]_D$ of plus 34 degrees centigrade.

Example 8.—6α-methyl-17α-hydroxyprogesterone from 6β-methyl-17α-hydroxyprogesterone A mixture of two grams of 6β-methyl-17α-hydroxyprogesterone, seventy milliliters of methanol, and ten milliliters of 2 normal sulfuric acid was refluxed for one hour. The mixture was cooled, neutralized with sodium bicarbonate solution, and the methanol was largely removed at reduced pressure. The addition of more water to the residual slurry dissolved the precipitated sodium sulfate and left a crystalline precipitate of crude product, which was filtered, washed with water and dried. The crude product thus obtained was recrystallized from methylene chloride-Skelly-solve hexanes to give 6α-methyl-17α-hydroxyprogesterone.

The 6-methyl-17α-hydroxyprogesterones have utility as sleep-potentiating and tranquilizing agents, and can be used orally with Hexobarbital sodium (Evipal sodium). 6-methyl-17α-hydroxyprogesterones possess also estrogenic and androgenic activity when used as injectables.

In the same manner given in Example 6 treating at reflux temperature 5α-17α-dihydroxy-6β-alkylpregnane-3,20-dione with an acid such as gaseous hydrogen chloride and gaseous hydrogen bromide produces the corresponding 6α-alkyl-17α-hydroxyprogesterone such as for example 6α - ethyl-17α-hydroxyprogesterone, 6 α- propyl-17α-hydroxyprogesterone, 6α - isopropyl-17α-hydroxyprogesterone, 6α-butyl-17α-hydroxyprogesterone, 6α-isobutyl-17α-hydroxyprogesterone and the like.

Similarly treating with very low acid or base concentration 5α,17α - dihydroxy-6β-alkylpregnane-3,20-diones results in the corresponding 6β-alkyl-17α-hydroxyprogesterone such as 6β-ethyl-17α-hydroxyprogesterone, 6β-propyl-17α-hydroxyprogesterone, 6β - isopropyl-17α-hydroxyprogesterone, 6β-butyl-17α-hydroxyprogesterone, 6β-isobutyl-17α-hydroxyprogesterone and the like.

Example 9.—6α-methyl-17α-hydroxyprogesterone 17-acetate

One gram of 6α-methyl-17α-hydroxyprogesterone was dissolved in a mixture of ten milliliters of acetic acid and two milliliters of acetic anhydride by heating. After the solution was effected the mixture was cooled to fifteen degrees centigrade, and 0.3 gram of paratoluenesulfonic acid was added. After allowing the mixture to stand for a period of two and one half hours at room temperature, the pink solution was poured into ice water to give an amorphous solid which was recovered by filtration. The precipitate was washed carefully with water and was then dissolved in ten milliliters of methanol and 1.5 milliliters of methylene chloride. The solution was concentrated to ten milliliters, diluted with 0.5 milliliter of ten percent sodium hydroxide, boiled for one minute and cooled. The product was recrystallized to give flakes of 6α-methyl-17α-hydroxyprogesterone 17-acetate, having a melting point 205 to 209 degrees centigrade and rotation $[\alpha]_D$ plus 56 degrees centigrade in chloroform.

Example 10.—6α-methyl-17α-hydroxyprogesterone 17-propionate

One gram of 6α-methyl-17α-hydroxyprogesterone was heated on the water bath with 25 milliliters of propionic anhydride. After six hours of heating to about 100 degrees the mixture was poured into 200 milliliters of ice water and the solids recovered by filtration. The thus obtained crude 6α-methyl-17α-hydroxyprogesterone 17-propionate was washed with water and then redissolved in methanol and methylene chloride. To the methylene chloride-methanol solution was added a small amount of ten percent aqueous sodium hydroxide and the mixture warmed to a gentle boil for two minutes. The mixture was then neutralized by the addition of acetic acid and the organic layer was separated from the aqueous layer. The organic layer was washed several times with water until completely free of traces of inorganic salts, dried, and evaporated. The residue was recrystallized two times from methanol and acetone to give pure 6α-methyl-17α-hydroxyprogesterone 17-propionate.

Example 11.—6α-methyl-17α-hydroxyprogesterone 17-benzoate

One gram of 6α-methyl-17α-hydroxyprogesterone and one gram of isopropenyl benzoate were refluxed in fifty milliliters of benzene for a period of six hours. The resulting mixture was poured into ice water and the solids collected on filter paper. The solids were redissolved in fifteen milliliters of methanol containing 0.5 milliliter of water and about fifty milligrams of sodium hydroxide. This mixture was heated on the water bath for ten minutes and thereupon allowed to evaporate. The thus obtained solids were redissolved in methanol and acetone and recrystallized twice from methanol and acetone to give pure 6α-methyl-17α-hydroxyprogesterone 17-benzoate.

Example 12.—6β-methyl-17α-hydroxyprogesterone acetate

In the same manner as given in Example 9, one gram of 6β-methyl-17α-hydroxyprogesterone was treated with acetic anhydride in acetic acid in the presence of 0.1 gram of para-toluenesulfonic acid. After one hour the mixture was poured into ice water and the solids recovered by filtration. Recrystallization of the solids from methanol and methylene chloride gave 6β-methyl-17α-hydroxyprogesterone 17-acetate.

Example 13.—6β-methyl-17α-hydroxyprogesterone 17-benzoate

In the same manner as shown in Example 11 6β-methyl-17α-hydroxyprogesterone was treated with isopropenyl benzoate to give 6β-methyl-17α-hydroxyprogesterone 17-benzoate.

Example 14.—6α-methyl-17α-hydroxyprogesterone 17-butyrate

In the same manner given in Example 9, treating 6α-methyl-17α-hydroxyprogesterone with butyric anhydride in the presence of two drops of sulfuric acid gives 6α-methyl-17α-hydroxyprogesterone 17-butyrate.

Example 15.—6α-methyl-17α-hydroxyprogesterone 17-valerate

In the same manner given in Example 9, treating 6α-methyl-17α-hydroxyprogesterone with valeric anhydride gives 6α-methyl-17α-hydroxyprogesterone 17-valerate.

Example 16.—6α-methyl-17α-hydroxyprogesterone 17-hexanoate

In the same manner given in Example 9, treating 6α-methyl-17α-hydroxyprogesterone with hexanoic anhydride in the presence of toluenesulfonic acid gives 6α-methyl-17α-hydroxyprogesterone 17-hexanoate.

Example 17.—6α-methyl-17α-hydroxyprogesterone 17-phenyl-acetate

In the same manner given in Example 9, treating 6α-methyl-17α-hydroxyprogesterone with phenylacetic anhydride gives 6α-methyl-17α-hydroxyprogesterone 17-phenylacetate.

Example 18.—6α-methyl-17α-hydroxyprogesterone 17-phenyl-propionate

In the same manner given in Example 9, treating 6α-methyl-17α-hydroxyprogesterone with phenylpropionic anhydride gives 6α-methyl-17α-hydroxyprogesterone 17-phenyl-propionate.

Example 19.—6β-methyl-17α-hydroxyprogesterone 17-propionate

In the same manner given in Example 12, treating 6β-methyl-17α-hydroxyprogesterone with propionic anhydride in the presense of small amounts of acid catalyst (toluenesulfonic acid) at room temperature gives 6β-methyl-17α-hydroxyprogesterone 17-propionate.

Example 20.—6β-methyl-17α-hydroxyprogesterone 17-butyrate

In the same manner given in Example 11, treating 6β-methyl-17α-hydroxyprogesterone with isopropenyl butyrate in the presence of toluenesulfonic acid at room temperature (twenty to 25 degrees centrigrade) gives 6β-methyl-17α-hydroxyprogesterone 17-butyrate.

Example 21.—6β-methyl-17α-hydoxyprogesterone 17-valerate

In the same manner given in example 11 treating 6β-methyl-17α-hydroxyprogesterone with isopropenyl valerate in the presence of toluenesulfonic acid at room temperature gives 6β-methyl-17α-hydroxyprogesterone 17-valerate.

Example 22.—6β-methyl-17α-hydroxyprogesterone 17-hexanoate

In the same manner given in Example 11 treating 6β-methyl-17α-hydroxyprogesterone with isopropenyl hexanoate in the presence of toluenesulfonic acid at room temperature gives 6β-methyl-17α-hydroxyprogesterone 17-hexanoate.

Example 23.—6β-methyl-17α-hydroxyprogesterone 17-(β-cyclopentylpropionate)

In the same manner given in Example 11 treating 6β-methyl-17α-hydroxyprogesterone with isopropenyl β-cyclopentylpropionate in the presence of toluenesulfonic acid at room temperature gives 6β-methyl-17α-hydroxyprogesterone 17-(β-cyclopentylpropionate).

Example 24.—6β-methyl-17α-hydroxyprogesterone 17-phenylacetate

In the same manner given in Example 11 treating 6β-methyl-17α-hydroxyprogesterone with isopropenyl phenylacetate in the presence of toluenesulfonic acid at room temperature gives 6β-methyl-17α-hydroxyprogesterone 17-phenylacetate.

In the same manner as shown in Examples 9 through 24, other esters of 6α- and 6β-methyl-17α-hydroxyprogesterone and of other lower 6α- and 6β-lower-alkyl-17α-hydroxyprogesterones are produced by allowing the anhydride or isopropenyl acylate of a selected acid to react with the steroid and if desired hydrolyzing with dilute alkali metal hydroxide any enol acylates produced. In this manner the acetate, propionate, butyrate, isobutyrate, valerate, isovalerate, hexanoate, heptanoate, octanoate, benzoate, phenylacetate, phenylpropionate, β-cyclopentylpropionate, decanoate, undecanoate, lurate, undecylenate, crotonate, acrylate and the like of 6α- and 6β-methyl-17α-hydroxyprogesterone, 6α- and 6β-ethyl-17α-hydroxyprogesterone, 6α- and 6β-propyl-17α-hydroxyprogesterone, 6α- and 6β-isopropyl-17α-hydroxyprogesterone, 6α- and 6β-butyl-17α-hydroxyprogesterone, 6α- and 6β-isobutyl-17α-hydroxyprogesterone and the like are produced.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. 6-methyl-17α-hydroxyprogesterone.
2. 6β-methyl-17α-hydroxyprogesterone.
3. 6α-methyl-17α-hydroxyprogesterone.
4. 6-methyl - 17α - hydroxyprogesterone 17 - acylate, wherein the acyl group is of a hydrocarbon carboxylic acid containing from one to twelve carbon atoms inclusive.
5. Lower fatty acid esters of 6-methyl-17α-hydroxyprogesterone.
6. 6α-methyl-17α-hydroxyprogesterone 17-acetate.
7. 6β-methyl-17α-hydroxyprogesterone 17-acetate.
8. A process for the production of 6-methyl-17α-hydroxyprogesterone 17-acylate which comprises: dehydrating a 5α,17α - dihydroxy-6β-methylpregnane-3,20-dione with a compound selected from strong acids and alkali metal hydroxides to obtain 6-methyl-17α-hydroxyprogesterone and esterifying the thus obtained 6-methyl-17α-hydroxyprogesterone with an acylating agent selected from acid anhydrides and isopropenyl acylates wherein the acyl radical is of a hydrocarbon carboxylic acid containing from one to twelve carbon atoms, inclusive, to obtain the corresponding 6-methyl-17α-hydroxyprogesterone 17-acylate.
9. A process for the production of 6α-methyl-17α-hydroxyprogesterone 17-acetate which comprises: dehydrating 5α,17α-dihydroxy-6β-methylpregnane-3,20-dione with an anhydrous strong mineral acid to obtain 6α-methyl-17α-hydroxyprogesterone and esterifying the thus obtained 6α-methyl-17α-hydroxyprogesterone with acetic anhydride in the presence of an acid catalyst to obtain 6α-methyl-17α-hydroxyprogesterone 17-actate.

10. A process for the production of 6α-methyl-17α-hydroxyprogesterone 17-acetate which comprises: dehydrating 5α,17α-dihydroxy-6β-methylpregnane-3,20-dione with dilute alkali to obtain 6β-methyl-17α-hydroxyprogesterone, isomerizing the thus obtained 6β-methyl-17α-hydroxyprogesterone with a strong mineral acid to obtain 6α-methyl-17α-hydroxyprogesterone and acetylating the thus obtained 6α-methyl-17α-hydroxyprogesterone with acetic anhydride in the presence of toluenesulfonic acid to obtain 6α-methyl-17α-hydroxyprogesterone 17-acetate.

11. A process for the production of 6-methyl-17α-hydroxyprogesterone 17-aceylate which comprises: treating 6-methyl-17α-hydroxyprogesterone with an acylating agent selected from acid anhydrides and isopropenyl acylates of hydrocarbon carboxylic acids wherein the acyl radicals of the hydrocarbon carboxylic acid contain from one to twelve carbon atoms, inclusive, to obtain the corresponding 6-methyl-17α-hydroxyprogesterone 17-acylate.

12. A process for the production of 6α-methyl-17α-hydroxyprogesterone 17-acetate which comprises: esterifying 6α-methyl-17α-hydroxyprogesterone with acetic anhydride in the presence of an acid catalyst to obtain 6α-methyl-17α-hydroxyprogesterone 17-acetate.

13. A compound having the following formula:

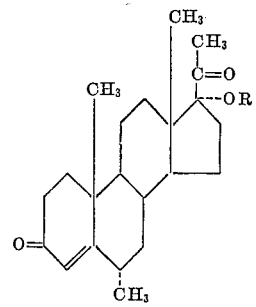

wherein R is selected from the group consisting of hydrogen and lower acyl.

References Cited
UNITED STATES PATENTS
3,172,885    3/1965    Krakower et al. ___ 260—239.55

ELBERT L. ROBERTS, Primary Examiner.
WALTER A. MODANCE, B. E. LANHAM, Examiners.